Oct. 26, 1965 G. P. GRAHAM 3,214,586

UNDERWATER RADIOGRAPHIC EXPOSURE DEVICE

Filed Oct. 29, 1962 2 Sheets-Sheet 1

INVENTOR.
Gene P. Graham

BY

Warren D. Hill

ATTORNEY

INVENTOR.
Gene P. Graham
BY
Warren D. Hill
ATTORNEY

United States Patent Office 3,214,586

Patented Oct. 26, 1965

3,214,586

UNDERWATER RADIOGRAPHIC EXPOSURE DEVICE

Gene P. Graham, Warren, Mich., assignor to General Motors Corporation, Detroit, Mich., a corporation of Delaware Filed Oct. 29, 1962, Ser. No. 233,664
5 Claims. (Cl. 250—65)

Figure 1:
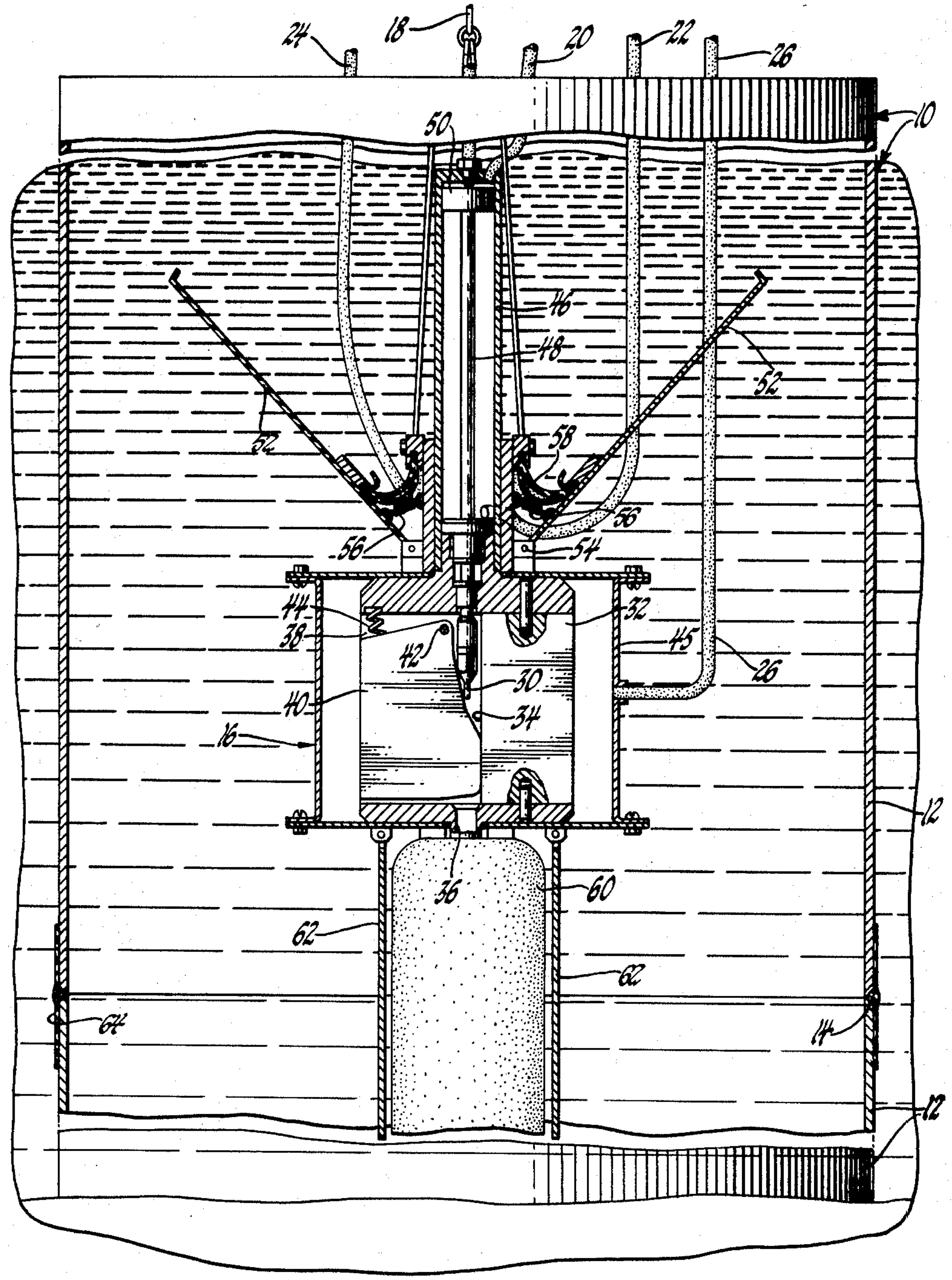

This invention relates to a radiographic exposure unit and more particularly to a radiographic exposure unit for producing radiograms of hollow objects.

There are thousands of off-shore platforms commonly known as Texas towers used, for example, to support oil drilling rigs. Each of these platforms is supported by a plurality of hollow cylindrical stilts or pilings which extend down through the water to the ocean floor and which are filled with water. These pilings are made up of a series of large diameter pipes welded end to end. For maintenance purposes it is necessary to periodically inspect the condition of the pilings, particularly the welded areas. Prior to the present invention, it has been necessary to terminate operations taking place on the platform and tow the platform many miles into shore where the inspection takes place. This, of course, entails an extremely great expense as well as loss of operating time.

The present invention, however, affords a means of radiographing the portions of the hollow pilings which are to be inspected without causing any interruption in the normal activities on the platform.

One difficulty in making a radiogram under water is that any liquid between the radiation source and the film will diffuse the radiation to distort and fog the resulting radiogram. The present invention avoids this difficulty by providing means to remove the liquid from the area under inspection.

The invention is carried out by displacing liquid from the interior of the object to be inspected, by placing a radioisotope source opposite the place to be inspected and by placing photographic film around the outer wall of the object whereby a radiogram of the object will be made. The apparatus according to the invention comprises a radiation shield containing a radioisotope source, means to position the shield within the hollow object, means to displace any liquid from the portion of the object to be inspected, and means to project the source from the shield into the portion to be inspected whereby the interior walls of the object will be irradiated by the source.

Figure 2:
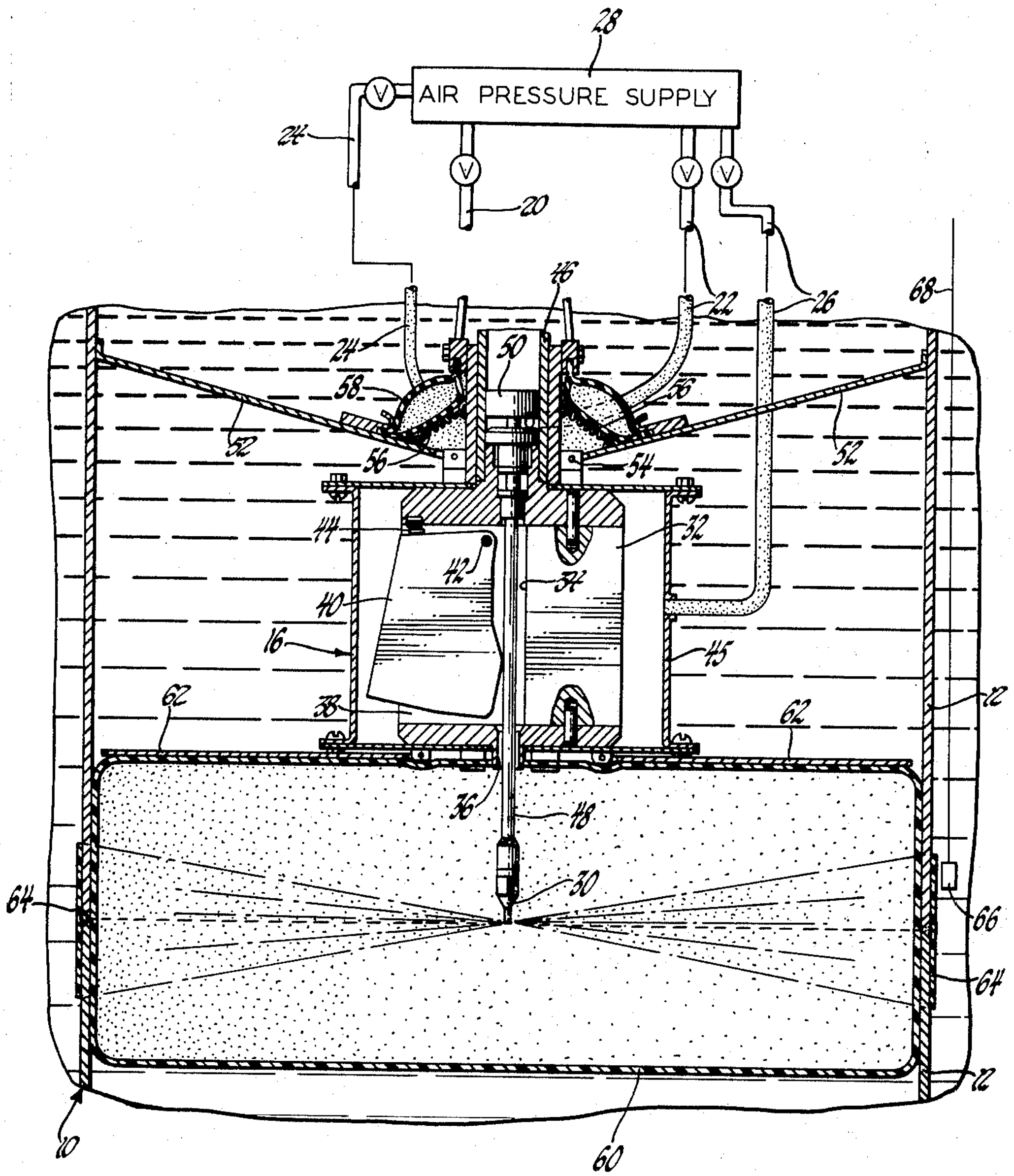

The above and other advantages will be made more apparent from the following specification taken in conjunction with the accompanying drawings wherein like reference numerals refer to like parts and wherein:

FIGURE 1 is a cross-sectional elevational view of an underwater exposure unit according to the invention, shown in folded position; and FIGURE 2 is a cross-sectional elevational view of the exposure unit of FIGURE 1 shown in exposure position.

In each figure of the drawings a hollow cylindrical piling 10 is composed of at least two cylindrical sections 12, 12 joined by a weld 14. The piling is shown immersed in water and also filled with water except that the extreme top portion of the piling extends above the surface of the water. An underwater radiographic exposure unit 16 is shown suspended within the piling 10 by a cable 18. A plurality of air hoses 20, 22, 24 and 26 extend from the exposure unit 16 to an air pressure supply 28 located externally of the piling 10.

The exposure unit 16 includes a radioisotope source contained within the extreme tip of source holder 30. The source material preferably is a low energy photon source which emits X-rays and/or gamma rays. Such sources are the subject of the co-pending application Serial No. 19,009, filed March 31, 1960, now U.S. Patent No. 3,161,504 by Black et al., and entitled "Radiation Source and Method for Making Same." A specific example of a preferred source material is ytterbium 169. When the source holder 30 is in its retracted position as shown in FIGURE 1 it is surrounded by a generally cylindrical shield 32 composed of a mass of lead, tungsten or other suitable shielding material. A centrally located passage 34 aligned with an aperture 36 in the shield 32 permits the source holder 30 to be moved axially out of the shield. A slot 38 formed in one side of the shield 32 receives a blade-like shutter 40 pivoted at its upper inner corner by a pin 42 so as to drop by the force of its own weight into the passage 34 between the source holder 30 and the aperture 36. In addition a coil spring 44 compressed between the upper outer corner of the shutter 40 and a portion of the shield 32 provides additional force to bias the shutter 40 into the passage 34 thereby preventing radiation from being emitted through the aperture 36 when the source holder 30 is in retracted position. A watertight casing 45 completely surrounds the shield 32 except that it does not cover the aperture 36.

A linear pneumatic motor 46 is secured to the top of the shield 32 and contains an actuator rod 48 secured at one end to the source holder 30 and at the other end to a piston 50 of the motor 46. Air lines 20 and 22 lead to opposite ends of the pneumatic motor 46 to provide air pressure for the operation thereof.

Three arms 52 (only two are shown in the drawing) are pivoted to a point 54 in the place where the pneumatic motor 46 joins the shield 32. The arms 52 are biased upwardly to the folded position as shown in FIGURE 1 by springs 56. An air motor 58 is provided to move the arms 52 outwardly against the inner walls of the piling 10 to center the exposure unit within the piling. The air motor 58 comprises a flexible double-walled annular member surrounding the housing of pneumatic motor 46 and secured thereto at one edge and having the other edge secured to the arms 52. An air line 24 is connected to the air motor 58. When air pressure is applied to the interior of motor 58 it inflates to assume a general doughnut shape and counteracts the force of springs 56 to move the arms 52 downwardly and outwardly against the inner walls of the piling. The arms 52 are so proportioned that when they are in engagement with the inner walls of the piling they slope upwardly and outwardly so that any upward force on the exposure unit will cause the arms 52 to tend to move to a more nearly horizontal attitude thereby causing the ends of the arms 52 to firmly press against the inner walls of the piling.

At the lower end of the shield 32 an inflatable bag 60 is fastened to the housing 45 around the aperture 36. An air hose 26 is connected to the housing 45. When air pressure is applied to housing 45 air will pass through the slot 38, shield 32, and through the aperture 36 into the bag 60 whereupon the bag will become inflated as shown in FIGURE 2 and will displace water from a portion of the interior of the piling until the bag touches the inner walls of the piling. A plurality of arms 62 are pivoted to the lower portion of the housing 45 and surround the bag 60 when it is deflated. However, when the bag is inflated the arms 62 are pivoted upwardly until they reach their limit of movement in a horizontal attitude. Hence, the arms 62 serve as upper supports for the bag 60 to assist in preventing the bag from becoming deformed upwardly by the buoyant forces of the water acting on the bag.

As shown in FIGURE 2 when air pressure is applied to air line 20 to pneumatic motor 46, the rod 48 moves downwardly to carry the source holder 30 through the passage 34 and through the aperture 36 into the inflated bag 60. During its travel from shielded to exposed position the source holder pushes against the shutter blade 40 to cam the blade out of the passage. When the source holder 30 is retracted by relieving pressure from air line 20 and applying pressure to air line 22 the shutter 40 will assume its closed position when source holder 30 reaches its retracted position.

In operation, a strip of X-ray film 64 is wrapped around the portion of the piling to be X-rayed. Usually this will occur in the vicinity of a weld. Preferably, the film is enclosed in a flexible plastic bag, not shown, or otherwise waterproofed. After the film is in position the exposure unit is lowered into the piling to the correct depth by means of the cable 18. Then pressure is applied to air line 24 to lower the centering arms 52 and pressure is applied to air line 26 to inflate the bag 62 to displace all water from the portion of the piling around which the film is wrapped. It should be noted that the inflated bag 60 assists the rams 52 in centering the exposure unit. Air pressure is applied to air line 20 to move the source holder 30 into the bag whereupon the walls of the piling 10 will irradiated by X-rays and gamma rays and exposing the film 64. If desired, a radiation monitor 66 may be placed adjacent the film 64 to determine the exposure time desired. The monitor may be held in place by an suitable means such as a magnet or suction cup. Such monitors are well known in the X-ray art and need not be further described here. The monitor would be electrically connected to the operator's station by insulated wiring 68. After the film has been exposed for the desired length of time the source holder 30 will be withdrawn to retracted position as previously described.

It will readily be seen that this invention provides a means for conveniently radiographing hollow objects, particularly those submerged in water without the necessity of removing the object from its usual location, or imparing its use during inspection.

It is to be understood that this description is illustrative of the preferred embodiment and the scope of the invention is intended to be limited only by the following claims:

I claim:

1. Means for irradiating a hollow liquid containing cylindrical object comprising a radiation shield adapted to fit within the object, a radioisotope source within the shield, an exit aperture in the shield, an inflatable bag secured to the shield and surrounding the aperture, means to inflate the bag to make contact with the portion of the object to be inspected whereby the liquid is displaced to provide a liquid-free path between the source and the said portion of the object, rigid support members connected to the shield to restrain one side of the bag, and motor means to move the source from the shield through the exit aperture into the bag after inflation of the bag and to withdraw the source into the shield.

2. Means for irradiating a hollow liquid filled cylindrical object comprising a radiation shield adapted to fit within the object, a radioisotope source within the shield, an exit aperture in the shield, an inflatable bag secured to the shield and surrounding the aperture, means to inflate the bag to make contact with the portion of the object to be inspected whereby the liquid is displaced to provide a liquid-free path between the source and the said portion of the object, a plurality of arms connected to the shield and movable into engagement with the walls of the object to position the shield, motor means to move the arms into engagement and to withdraw the arms from the walls, and motor means to move the source from the shield through the exit aperture into the bag after inflation of the bag and to withdraw the source into the shield.

3. Means for inspecting a hollow liquid containing cylindrical object comprising a radiation shield adapted to fit within the object, a radioisotope source normally within the shield, an exit aperture in the shield, an inflatable bag secured to the shield and surrounding the aperture, means to inflate the bag to make contact with the portion of the object to be inspected whereby the liquid is displaced to provide a liquid-free path between the source and the said portion of the object, a plurality of arms connected to the shield and movable into engagement with the walls of the object to position the shield, motor means to move the arms into engagement with the walls, motor means to move the source from the shield through the exit aperture into the bag after inflation of the bag and to withdraw the source into the shield thereby irradiating the object, and photographic film around the outer walls of the object for exposure to radiation passing therethrough.

4. A radiographic exposure unit for irradiating the inner walls of a hollow liquid containing cylindrical object comprising a shielded body member, an aperture in the body member, a radioisotope source containable within the body member, folding arm means to locate the body member within the object, motor means to urge the folding arm means against the inner walls, inflatable bag means secured to the body member, means to inflate the bag means whereby the liquid is displaced to provide a liquid-free path between the source and the said portion of the object, and motor means to move the source from the body member through the aperture into the bag means after inflation of the bag means to irradiate the object.

5. A radiographic exposure unit for irradiating the inner walls of a hollow liquid containing cylindrical object comprising a shielded body member, an aperture in the body member a radioisotope source containable within the body member, pneumatically operated means to locate the body member within the object, inflatable bag means secured to the body member, pneumatic means to inflate the bag means whereby the liquid is displaced to provide a liquid-free path between the source and the said portion of the object, pneumatic motor means to move the source from the body member through the aperture into the bag means after inflation of the bag means to irradiate the object, and a controlled pneumatic pressure supply connected to the various pneumatically operated means.

References Cited by the Examiner

UNITED STATES PATENTS

| | | | |
|---|---|---|---|
| 2,412,174 | 12/46 | Rhoades | 250—106 X |
| 2,747,100 | 5/56 | Wyllie | 250—83.6 X |
| 2,750,517 | 6/56 | Baum | 250—108 |
| 2,935,615 | 5/60 | True | 250—83.6 |
| 3,064,127 | 11/62 | Green | 250—106 X |

OTHER REFERENCES

"Faster Pipe, Weld Testing Uses Ir[1] 92," Nucleonics, January, 1959, pages 98 and 99.

RALPH G. NILSON, *Primary Examiner.*